Ｕ Ｓ 　 Patent 　 Number:　 6,063,855

United States Patent [19]
Pecsok et al.

[11] Patent Number: 6,063,855
[45] Date of Patent: May 16, 2000

[54] PROCESS FOR THE MANUFACTURE OF VINYLIDENE FLUORIDE POWDER COATINGS

[76] Inventors: Roger L. Pecsok, 314 Abbey Rd.; Julius E. Dohany, 480 Howellville Rd., both of Berwyn, Pa. 19312

[21] Appl. No.: 09/002,313

[22] Filed: Jan. 2, 1998

[51] Int. Cl.$^7$ .................................................. C08L 27/02
[52] U.S. Cl. .............................. 524/520; 524/501; 525/88
[58] Field of Search ..................................... 524/501, 520; 525/88

[56] References Cited

U.S. PATENT DOCUMENTS

| | | | |
|---|---|---|---|
| 2,681,324 | 6/1954 | Hochberg | 260/29.6 |
| 3,324,069 | 6/1967 | Koblitz et al. | 260/31.4 |
| 3,340,222 | 9/1967 | Fang | 260/41 |
| 4,022,737 | 5/1977 | Sekmakas et al. | 260/29.4 |
| 4,128,519 | 12/1978 | Bartoszek et al. | 260/29.6 |
| 4,141,873 | 2/1979 | Dohany | 260/29.6 |
| 4,309,328 | 1/1982 | Carson et al. | 260/29.6 |
| 4,360,652 | 11/1982 | Dohany | 526/210 |
| 4,383,075 | 5/1983 | Abel | 524/512 |
| 4,400,487 | 8/1983 | Stoneberg et al. | 525/199 |
| 4,569,978 | 2/1986 | Barber | 526/206 |
| 4,770,939 | 9/1988 | Sietses et al. | 428/402 |
| 4,942,203 | 7/1990 | Conti-Ramsden et al. | 525/185 |
| 5,030,394 | 7/1991 | Sietses et al. | 264/28 |
| 5,093,427 | 3/1992 | Barber | 525/276 |
| 5,177,150 | 1/1993 | Polek | 525/199 |
| 5,218,031 | 6/1993 | Nayder et al. | 524/376 |
| 5,229,460 | 7/1993 | Yousuf et al. | 525/198 |
| 5,346,727 | 9/1994 | Simkin | 427/486 |
| 5,397,831 | 3/1995 | Saito et al. | 524/502 |
| 5,405,912 | 4/1995 | Simkin | 525/199 |
| 5,583,190 | 12/1996 | Brinati et al. | 526/230.5 |
| 5,739,202 | 4/1998 | Pecsok | 524/520 |
| 5,856,377 | 1/1999 | Sato et al. | 523/201 |

*Primary Examiner*—David W. Wu
*Assistant Examiner*—Caixia Lu-Rutt

[57] ABSTRACT

A process for preparing a pigmented vinylidene fluoride polymer based powder coating composition that comprises dispersing at least one pigment In an aqueous dispersion or latex of a fluorine-free polymer that is compatible with the vinylidene fluoride polymer and, if needed, conventional paint additives, which may include a polyoxyalkylene glycol block polymer. Subsequently the aqueous pigment dispersion is blended with said vinylidene fluoride polymer powder, milled, dried, and classified to obtain the specified particle size.

5 Claims, No Drawings

PROCESS FOR THE MANUFACTURE OF VINYLIDENE FLUORIDE POWDER COATINGS

FIELD OF THE INVENTION

This invention concerns a process for preparing a pigmented film-forming vinylidene fluoride polymer based powder, which is suitable for applications by the powder coating method to form a strong and protective film on substrates.

BACKGROUND OF THE INVENTION

Vinylidene fluoride polymer based coatings are well known. They are used extensively for protection or decoration or both of a variety of substrates. These coatings are also known for their exceptional durability with resistance to the effect of weathering and adverse chemical environments. A particularly useful category of vinylidene fluoride polymer coatings is the well-known architectural paint finish for building panels and other articles of sheet metal and metal extrusions. Various systems have been devised for laying down a film-forming composition of normally solid vinylidene fluoride polymers to give the substrates the desired long term protection against the effect of chemicals and weather. U.S. Pat. No. 3,324,069 to Koblitz et al. (1967) disclosed a composition comprising a vinylidene fluoride polymer, a latent solvent for said vinylidene fluoride polymer, and an acrylate polymer dissolved in said latent solvent. U.S. Pat. No. 3,340,222 to Fang (1967) disclosed a liquid film-forming composition comprising a volatile organic liquid, a vinylidene fluoride polymer, and adsorbed on the pigment an acrylate polymer. The pigmented organosol dispersions or paint finishes are applied by conventional means to the metallic substrate. After application, the coated substrate is baked at sufficiently high temperature and time to drive off the solvent and fuse the vinylidene fluoride polymer film to the substrate. U.S. Pat. No. 4,400,487 to Stoneberg et al. (1983) disclosed textured coatings comprising a vinylidene fluoride polymer, an acrylic resin and a particulate fluoropolymer. Stoneberg mentioned that the acrylic resin can be also in latex form and is cited for reference. The increasing emphasis on environmental protection as defined by the Clean Air Act makes organic solvent containing film-forming compositions no longer desirable. Accordingly, there is a growing need for environmentally friendly paint finishes that are essentially free of organic solvents.

U.S. Pat. No. 4,022,737 to Sekamakas et al. (1977) disclosed stable aqueous dispersions of a vinylidene fluoride polymer powder and an acrylate resin latex. U.S. Pat. No. 4,128,519 to Bartoszek et al. (1978) disclosed water-based vinylidene fluoride polymer coatings that contain an emulsified liquid epoxy resin. U.S. Pat. No. 4,141,873 to Dohany (1979) disclosed aqueous dispersions of a vinylidene fluoride polymer and admixed therewith an aqueous dispersion of an acrylate polymer and a water-soluble organic solvent acting as film-coalescing agent. U.S. Pat. No. 4,309,928 to Carson et al. (1982) disclosed methods for producing stable aqueous dispersions of vinylidene fluoride polymer powder. U.S. Pat. No. 4,383,075 to Abel (1983) disclosed an aqueous thermosetting coating composition that comprise a reactive group containing high $T_g$ acrylic resin latex and a vinylidene fluoride polymer.

Vinylidene fluoride polymer based powder coatings are suitable alternative to organosol or aqueous dispersions. Processes for the preparation of film-forming vinylidene fluoride polymer based powder coatings are disclosed in U.S. Pat. Nos. 4,770,939 to Sietses at al. (1988), 5,030,394 to Sietses et al. (1991), 5,177,150 to Polek (1993), 5,229,460 to Yousuf et al. (1993), 5,346,727 to Simkin (1994), and 5,405,912 to Simkin (1995). The processes of the prior art require that the ingredients of the compositions comprising a vinylidene fluoride polymer, an acrylite polymer, and at least one pigment be first melt compounded from about 190° C. to 240° C. using an extruder, roller mill, or any other appropriate heated mixing device. Thereafter the melt mixed compound is pelletized and milled at cryogenic temperature from about –50° C. to about –150° C. using liquid nitrogen as coolant and sieved to obtain a powder having specified particle size.

These processing steps suffer from several disadvantages. They require significant amount of energy to extrude and pelletize the polymer compound, and to cryogenically grind the pellets to obtain the powder. The cryogenic grinding step also consumes a large amount of liquid nitrogen that is used as coolant. After cryogenic grinding, if desired or required, the powder is classified and larger particles are usually recycled to the mill for more grinding as described in U.S. Pat. No. 5,030,394. Regrinding of larger particles adds to the consumption of liquid nitrogen and energy input. A change from one color to another requires purging of the extruder of the compound having the first color by introducing a purge compound or the compound of the second color. This process inevitably produces an intermediate product of an undesired color that must be discarded as scrap, thereby resulting in waste of material and time.

Accordingly, there is a need for a method that avoids extrusion compounding of the blend and cryogenic grinding of pellets to powder. In the U.S. Pat. No. 5,739,202 (1998) Pecsok disclosed a novel process for the manufacture of pigmented film-forming vinylidene fluoride polymer powders suitable for powder coating applications. This process avoids the use of extrusion or melt compounding and cryogenic grinding of the pellets. However, the process uses a volatile and flammable organic solvent during the preparation of the powder coating compositions. Accordingly, there is a need for an improved process that does avoid the use of any volatile organic solvent during the preparation of powder coatings and avoids melt compounding of blends and cryogenic grinding of pellets to powder.

OBJECT OF THE INVENTION

Objects and advantages of our invention are:

(a) to provide a process to prepare a pigmented film-forming vinylidene fluoride polymer powder without the need for melt compounding and cryogenic grinding;

(b) to provide a process that does not use any organic solvent during the processing steps;

(c) to provide a process that is simple to use and that obviates the use of extruders and cryogenic grinders.

SUMMARY OF THE INVENTION

Our invention relates to an improved process for the preparation of a pigmented film-forming vinylidene fluoride polymer based powder that comprises the steps of:

(a) dispersing at least one pigment in an aqueous dispersion of a fluorine-free polymer that is compatible with the vinylidene fluoride polymer;

(b) mixing the blend from step (a) with a vinylidene fluoride polymer powder;

(c) transfer the mixture from step (b) to a two-roll mill for additional mixing and forming of fragile thin sheets;

(d) drying the sheets from step (c) and classifying the powder to obtain the specified particle size.

DETAILED DESCRIPTION OF THE INVENTION

Under the term "vinylidene fluoride polymer" used herein is meant not only the normally solid homopolymer of vinylidene fluoride but also the normally solid copolymers of vinylidene fluoride with at least one comonomer selected from the group consisting of tetrafluoroethylene, trifluoroethylene, chlorotrifluoroethylene, hexafluoropropylene and mixtures thereof, there being in said copolymer at least about 75 mole % of polymerized vinylidene fluoride repeat units. The vinylidene fluoride polymer used for the preparation of the film-forming powders embodied herein are fine polymer powders that have a particle size less than 75 $\mu$m and preferably less than 25 $\mu$m in diameter. Particularly preferred are the fine powders formed by the emulsion polymerization method as described for example in U.S. Pat. Nos. 4,360,652 to Dohany (1982), 4,569,978 to Barber (1986), 5,093,427 to Barber (1992), and 5,583,190 to Brinati et al. (1996). The emulsion polymerization method produces a latex that contains spherical vinylidene fluoride polymer particles that are about 0.25 $\mu$m in diameter and the dried polymer powder contains clusters of agglomerated spheres ranging from about 2 $\mu$m to about 25 $\mu$m in diameter. The melt viscosity of the vinylidene fluoride polymer should be sufficiently low to be useful for powder coating applications. Low melt viscosity will assure good flow and film formation when the powder is oven-baked to fuse the formed film to the substrate. The preferred melt viscosity range is from about 4 kilopoise to about 8 kilopoise measured at 232° C. and 100 sec$^{-1}$ (according to ASTM D3835). It should be understood that some low viscosity vinylidene fluoride polymers could be used advantageously, as shown in Table 1 of said U.S. Pat. No. 5,177,150, and do not implicitly compromise the properties of the finished coating.

The pigmented powder compositions of this invention may include at least one organic or inorganic pigment but inorganic pigments are preferred. Inorganic pigments usually have better resistance to the film fusion temperatures and have better resistance to the adverse effect of long term weathering. Preferred are ceramic metal oxide type pigments that are calcined. For white compositions that should be resistant to chalking or yellowing on exposure to weather, rutile type titanium dioxide is preferred. Other pigments, which can be used, are described in said U.S. Pat. No. 3,340,222. The pigment concentration in the compositions of this process can be from about 1 to about 40 weight percent of the compound, preferably from about 15 to about 20 weight percent.

Under the term "fluorine-free polymer" used herein is meant any normally solid polymer that is compatible with said vinylidene fluoride polymer. Polymers that are especially useful for the purposes of this invention as fluorine-free polymers are composed of alkyl methacrylate, alkyl acrylate, and a blend thereof. Maximum retention of color and gloss on baking and weathering is usually obtained with these acrylic ester polymers. It is known from said U.S. Pat. No. 3,340,222 that the embodied acrylic ester polymers with ester-side groups are preferentially adsorbed by the pigment that enhance pigment dispersion in the powder, which is prepared by this process. Most preferred are copolymers of methyl methacrylate containing from about 10%, to about 40% by weight of one or several comonomers exemplified by acrylic acid, methacrylic acid, methylacrylate, ethylacrylate, butylacrylate, ethyl methacrylate and the like.

The acrylate polymer is present in the latex embodied herein as finely dispersed particles within a size range from about 0.1 $\mu$m to about 1.0 $\mu$m. The commercially available latices generally contain from about 38 to about 50 weight percent polymer solids. The acrylate polymer concentration used in this process can be from about 5 to about 40 weight percent and preferably from about 10 to about 30 weight percent of the combined polymers.

Conventional paint additives known in the art, which enhance flow and appearance of the finished coating, can be included in the compounds that are prepared by the process of this invention. Thus, the process may include: flow promoting agents, leveling agents, surfactants, antioxidants, and ultraviolet light absorbers. Preferred flow promoting agents for the process of this invention are the well-known phthalate esters and very low molecular weight acrylate resins. Of the surfactants particularly preferred are the copolymers of ethylene oxide and propylene oxide, also known in the art as polyoxyalkylene glycol block polymers. The use of these block polymers in combination with flow promoters enhances the appearance of the resulting coating and decreases defects such as pin holes, and craters.

An appropriate blending apparatus equipped with a high speed high sheer agitator, often called a dissolver, is charged with an acrylate latex, a pigment or a blend of pigments, and, if needed, any of the above cited conventional additives. The charge is blended until a smooth paste is formed. At this point, a small sample of the paste is dried, the color is compared to the reference and the color of the paste is adjusted if necessary. Upon matching the color, the pigmented paste is blended with the vinylidene fluoride polymer powder to form a dough. The dough is then transferred to a two-roll mill for additional mixing and rolling into fragile thin sheets. The sheets are then dried and classified at ambient temperature in a turbo screening device that has an appropriate screen size to obtain the specified powder particle size. The oversize particles are recycled for more milling and classification. The screen size of the classifier will depend on the application method intended for the powder. For example, for electrostatic spraying the typical particle size range is from about 25 $\mu$m to about 50 $\mu$m and the screen size is generally from about 75 $\mu$m to about 90 $\mu$m.

The finished powder is applied to a pretreated substrate, preferably coated with an appropriate primer, using any method known in the art to obtain a uniform distribution of the powder over the surface of the substrate. Electrostatic spraying is the preferred method of application. Following the application, the substrate covered with the powder layer is subjected to a temperature that will melt the polymer binder and for long enough time to form a smooth adherent film on the substrate, generally between 230 degree and 260 degree Celsius and from about 1 to about 15 minutes.

The following examples illustrate our invention. In these examples, unless otherwise indicated, all weights are in parts by weight, RHOPLEX B-88 is an acrylate latex containing 42.5% solids available from the Rohm and Haas Company, TI-PURE R-960 is a white pigment, rutile titanium dioxide, available from the Du Pont Company, SANTICIZER 278 is a 12 alkyl benzyl phthalate plasticizer available from the Monsanto Company, PERENOL F-40 is an acrylate resin based paint additive available from the Henkel Corporation, PLURONIC P-104 is a polyoxyalkylene glycol block polymer available from the BASF Corporation, HYLAR MP-6 is a vinylidene fluoride polymer powder available from Ausimont USA, Inc., and KYNAR 711 is a vinylidene fluoride polymer powder available from Elf Atochem North America, Inc.

EXAMPLE 1

A blender equipped with a high speed high shear agitator is charged with 100 parts RHOPLEX B-88, 35 parts TI-PURE R-960, 1.5 parts SANTICIZER 278, 0.5 parts PERENOL F40, and 2 parts PLURONIC P-104 and the charge is dispersed at 1100 rpm. After the dispersion is completed, 100 parts HYLAR MP-6 is added and dispersed in the aqueous blend resulting in a dough-like consistency. The "dough" is transferred to a two-roll mill and rolled out into thin fragile sheets. The thin sheets are dried and classified at ambient temperature in a turbo screen (from Sweco) having a 90 µm screen. The oversize particles are recirculated for additional milling and classification. The screened powder is then sprayed using an electrostatic gun (GEMA) onto a 2 mm thick pretreated aluminum panel (available from the Q-Panel Corporation). The coated panel is then baked at 232° Celsius for 15 minutes. The resulting coating is about 50 µm to about 65 µm thick. The coating had a smooth surface and was free of surface defects.

EXAMPLE 2

The procedure of Example 1 was followed except that the composition was changed to 100 parts RHOPLEX B-88, 35 parts TI-PURE R-960, 15 parts SANTICIZER 278, 2 parts PERENOL F40, and 100 parts HYIAR MP-6. The resultant coating had a smooth surface and was free of surface defects.

EXAMPLE 3

The procedure of Example 1 was followed except that the composition was changed to 100 parts RHOPLEX B-88, 35 parts TI-PURE R-960, 4 parts PLURONIC P-104, and 100 parts HYLAR MP-6. The resultant coating had a dull surface and some surface defects.

EXAMPLE 4

The procedure of Example 1 was followed except that the composition was changed to 100 parts RHOPLEX B-88, 35 parts TI-PURE R-960, and 100 parts HYLAR MP-6. The resultant coating had a poor surface and many surface defects.

EXAMPLE 5

The procedure of Example 1 was followed except that HYLAR MP-6 was replaced with KYNAR 711. The coating had a smooth surface and was free of surface defects.

CONCLUSION AND SCOPE OF THE INVENTION

Thus the reader will see that our process for producing a pigmented film-forming vinylidene fluoride polymer based powder coating composition is simple and does not require extrusion and cryogenic grinding of the compound. While the above description and examples contain many specifications, these should not be construed as limitations on the scope of the Invention, but rather as an exemplification of one preferred embodiment thereof. Accordingly, the scope of the invention should be determined not by the embodiments but by the appended claims and their legal equivalents

We claim:

1. A process for producing a pigmented film-forming vinylidene fluoride polymer powder that is suitable for powder coating applications comprising the steps of:

(a) dispersing at least one pigment in an aqueous dispersion of a fluorine-free polymer that is compatible with the vinylidene fluoride polymer, (b) mixing the aqueous dispersion from step (a) with a powder of said vinylidene fluoride polymer, (c) milling, drying, and classifying the compound from step (b) to obtain a specified particle size ranging from about 2 to 75 µm.

2. The process according to claim 1 wherein said vinylidene fluoride polymer includes at least 75 mole percent vinylidene fluoride monomer units.

3. The process according to claim 1 wherein said vinylidene fluoride polymer includes comonomers selected from the group of monomers consisting of hexafluoropropylene, tetrafluoroethylene, and mixtures thereof.

4. The process according to claim 1 wherein the average of said predetermined powder particle size is about 25 to 50 µm, whereby the particles have substantially globular structure.

5. A powder coating composition that is prepared according to the process of claim 1, wherein said vinylidene fluoride polymer powder consists of a vinylidene fluoride homopolymer.

* * * * *